UNITED STATES PATENT OFFICE.

JOHN BRAGG, OF CLEVELAND, OHIO.

PROCESS OF DEODORIZING AND PURIFYING PETROLEUM-OIL.

SPECIFICATION forming part of Letters Patent No. 604,515, dated May 24, 1898.

Application filed August 12, 1895. Serial No. 559,046. (No specimens.)

*To all whom it may concern:*

Be it known that I, JOHN BRAGG, a citizen of the United States, residing at Cleveland, in the county of Cuyahoga and the State of Ohio, have invented a certain new and useful improvement in the process of deodorizing and purifying petroleum-oil, whereby its quality for burning or for use in the arts is improved; and I do hereby declare that the following is a full, clear, and exact description of the invention, which will enable others skilled in the art to which it appertains to make and use the same.

In the usual treatment of crude petroleums they are refined by distilling the volatile parts and collecting the distillate in fractions, reserving a certain portion for burning-oil, the treatment of which illustrates the treatment for the others in principle and may be described as follows:

The burning-oil distillate is placed in an agitator and subjected to agitation with sulfuric acid, and after the latter has settled it is drained off and the oil agitated with an alkaline liquor which neutralizes the acids in the oil and with them settles to the bottom, whence all are withdrawn, leaving the oil more or less purified.

Owing to the fact that some petroleum-oils contain a large amount of sulfur and other undefined impurities of disagreeable odor, which are only partly removed by the above treatment, various modifications have been used to obtain an improved result—for instance, the agitation of the distillate with metallic oxids, such as litharge, oxid of copper, oxid of manganese, &c.; but these substances being practically insoluble in the oil require a constant and prolonged application of the force of agitation to bring them into sufficient contact with all the atoms or molecules of sulfur and other bodies in the oil upon which they are intended to react and by virtue of their greater affinity to withdraw the sulfur and other bodies from the oil, and thus deodorize and purify the same somewhat; also, the burning-oil in the form of vapor has been made to pass through a bath of a solution of metallic oleate or colophonate, and after escaping from the bath, having been deprived more or less of its sulfur in passing through, it is condensed and subjected to the usual successive agitations with acid and alkali similar to that above described.

The necessity for continually passing the vapor into, through, and out of the bath results in an imperfect abstraction of the sulfur and other bodies by the solution, since while the globular surface of the bubbles of vapor would be in momentary contact with the metallic solution surrounding it their interior particles would not be so exposed, and therefore the resultant escaping vapor would only be partially deprived of sulfur and other particles from the lack of complete exposure of all molecules of sulfur, &c., of the oil to the action of the bath and lack of sufficiently prolonged contact of their respective elements to allow the change of affinities to be complete.

The object of my invention is to eliminate the sulfur and other malodorous bodies, commonly called "skunk," from the petroleum-oils and make the resultant oils deodorized and purified and more useful in the arts without, as heretofore, resorting to the use of the continually-applied force of agitation to bring the molecules of oil into imperfect successive momentary or temporary contact with the particles of subsiding metallic oxids, which of themselves are insoluble in the oil and incapable of themselves of being in a state of uniform constant contact with the oil, and also without resorting to the method in vogue of forcing the oil-vapor as it is being distilled into a solution of metallic oleate or colophonate or the like, whereby only a momentary and temporary imperfect contact would be produced, but rather by producing a prolonged and of itself practically inseparably intimate contact of the oil with a solution within it of such bodies as are soluble therein and possess the property of reacting with the sulfur or other impurities, and subsequent to such reaction by the addition of other chemical substances, causing a removal of the sulfur and other impurities, together with the ingredients of the added compound, leaving the oil thereby purified and practically free from all skunk and all malodorous and other impurities.

To carry my invention into effect, I prefer to distil from the crude oil the most inflammable parts and to then collect the distillate used for and known as "burning-oil" and proceed to treat it, although my process is applicable to any petroleum fluid requiring deodorization and purification from sulfur and other malodorous bodies and other impurities.

I prepare the burning-oil for treatment by incorporating thoroughly therewith a metallic soap solution or soapy emulsion, such as an oleate or colophonate, which is prepared in the usual way. To prepare an oleate, I treat a saponifiable oil—such, for instance, as cotton-seed oil—by mixing with it any metallic oxid which has the property of saponifying oil, such as the oxids of lead or manganese, together with water to the amount of about one-quarter of the oil to be saponified and heat the mixture, as by steaming or boiling it, in the ordinary way of producing a saponification.

To make a colophonate, a resin soap is first prepared by boiling about sixty-three parts of rosin with seven parts of caustic soda and several times as much water in volume as of both substances until saponification is effected. The clear liquid is then drawn off from the soapy mass, and the latter is again boiled with ten parts more of caustic soda and about as much water as before until a clear translucent jelly-like mass is formed. This jelly-like mass is then dissolved in a larger amount of water, and there is added thereto a solution (of about five per cent. strength) of sugar of lead or sulfate of manganese or other soluble lead salt or manganese salt in sufficient quantity to cause a copious precipitate, which will be a colophonate of lead or manganese, as the case may be, and which is collected and dissolved in the oil to be treated, or, as an alternative way of preparing the colophonate, the oxids or hydroxids of lead or manganese may be mixed with the rosin in proper chemical proportion and heated until they chemically unite and form a colophonate of the respective metallic oxid or hydroxid used.

The method of forming oleates and colophonates is well understood, and I do not limit myself to their formation by the precise processes described, but I give such processes as illustrative merely, and wish it understood that the oleate or colophonate used in my process of purifying oil may be produced by any process adapted therefor.

When the saponification has been effected, I prefer to thin down the soap or oleate or colophonate into the form of an emulsion or solution by the addition of burning-oil. When reduced to the proper consistency—that of cream or thinner—I add to the batch of oil to be treated about one-half to two per cent. of its volume of the emulsion or solution and thoroughly incorporate it by agitation with the batch of oil to be treated, in which it diffuses and dissolves, or I treat the burning-oil by adding and stirring into it in an agitator or suitable receptacle of oleate of lead from one-fourth ($\frac{1}{4}$) to one per cent. of the weight of the oil and an approximately equal quantity of oleate of manganese or other oleates, which oleates for convenience I previously dissolve in a small amount of burning-oil to render them more readily miscible with the oil to be treated, in which they at once diffuse and dissolve. In the presence of appreciable quantities of sulfureted bodies in the oil a reaction rapidly takes place between the added metallic element and the sulfureted bodies, which is plainly indicated by the whole liquid turning brownish-black and emitting sulfurous fumes. In case the oil is unusually skunky a slightly larger proportion of the oleate or metallic element may be used. After sufficient time has elapsed for the reaction to be complete, which need not be more than one hour, I add to the oil and agitate in several intervals, a fraction at a time, the usual quantity of sulfuric acid—about one to one and a half per cent. in all—and agitate for at least half an hour, whereby not only are some of the sulfur compounds further decomposed and disagreeable gases eliminated from the oil, but some of the tarry, resinous, and coloring matters are precipitated with the acid, and the metallic element of the added oleate is largely dissolved in and carried down by the acid. After the subsidence of the acid, together with the substances it has dissolved or carried down, the acid sludge is drawn off and an alkaline solution added and agitated with the oil for half an hour approximately. Besides the usual effect of neutralizing any traces of added acid yet remaining in the oil this treatment will dissolve out and neutralize fatty or other acid radicals which form in the treatment or were added to the oil in course of treatment, besides dissolving out of the oil such sulfureted and other impurities as are soluble in an alkaline fluid. After subsidence the alkaline sludge is drawn off, and the oil may be washed in the usual way with water to remove any lingering traces of alkali. Should the preceding steps have been carefully performed, this in many cases would suffice; but I prefer to wash the oil after the alkaline sludge has been removed by agitating it with a chlorin solution, made by dissolving chlorin in water or any solution of alkali to saturation, and adding it to the batch of oil in successive portions. The quantity of chlorin solution to be added to the oil will vary with the strength of the solution and the amount of sulfureted or other impurities remaining in the oil. Assuming a five per cent. solution to be employed, an amount of it equal to about one per cent. of the oil to be purified should be amply sufficient if the preceding steps have been carefully and thoroughly performed, and this would preferably be added in two or more portions, testing the oil for sulfur after each addition of chlorin solution and agitation, such tests showing less reaction of sulfur as successive quantities are added until finally the oil is found no longer to react with the usual tests for sulfur. The effect of the treatment with chlorin solution is to oxidize any remaining traces of sulfureted or other malodorous bodies and also to remove any traces of lead or manganese and in addition to slightly bleach the oil. The chlorin liquor is drawn off after subsidence, and the oil is again washed by agitation with a weak solution of hyposulfite of soda to remove by solution therein traces of acid radicals, as well as any metallic or other bodies still in the oil. After subsidence of such impurities the oil is drawn off and may be steamed or washed by agitation with water and then steamed for final purification, when, after drawing off the water, it will be found practically deodorized and purified and ready for use in the arts.

The order of the various steps as given above is that which I prefer; but it will of course be apparent to a chemist that the order of the addition of acid and alkali may be reversed, the alkali being added first and the acid afterward, thus reaching the same result by means of a different kind and order of reactions. The object is in each case to disrupt the new compound formed by the reaction between the sulfo elements of the oil and the added oleate or colophonate and to effect the removal seriatim of the elements of such new compound by the successive reactions therewith of the acid and alkali in whichever order they may be used.

My above-described process of purification is capable of application alone or as an adjunct to other steps in the purification of petroleum-oil. Thus the burning-oil distillate may be taken after it has been subjected to the ordinary incomplete purification of acid and alkali and while still containing a residue of sulfurous and malodorous impurities and treated by my process for its further and complete purification, using of course correspondingly smaller quantities of reagents and a shorter time, or the oil may be first subjected to my process for its substantial purification and again treated by any other known purifying process, if thought desirable.

What I claim as my invention, and desire to secure by Letters Patent, is—

1. The process of deodorizing and purifying petroleum-oil, which consists in first dissolving in the oil a metallic compound soluble in the oil and whose metallic constituent is combinable with the sulfur element of the oil, such for instance as an oleate or colophonate, subsequently breaking up the compound or emulsion thus formed by the addition thereto of a substance capable of reacting with the metallic element of the compound added, whereby the metallic constituents of the mass are caused to separate from the oil, and finally removing from the oil the separated impurities and precipitates, without distillation, substantially as described.

2. The process of deodorizing and purifying petroleum-oil which consists in effecting the solution in the liquid oil of a metallic soap or emulsion, subsequently decomposing the metallic soap by the addition of acid to the oil under treatment, whereby the skunk is driven off and a precipitation of the impurities is caused, separating the purified oil from such precipitate, and then neutralizing the acid remaining in the oil and washing the oil, substantially as described.

3. The process of deodorizing and purifying petroleum-oil which consists in forming a solution in the liquid oil of a metallic soap or emulsion and agitating the same to diffuse the same thoroughly throughout, then adding sulfuric acid to precipitate the metallic elements of the solution and separate the impurities from the oil, separating the oil from such precipitate, and then washing the oil with alkaline and chlorin solution, substantially as described.

4. The process of deodorizing and purifying petroleum-oil which consists in dissolving in the liquid oil with agitation a metallic soap or emulsion, then adding sulfuric acid to precipitate the metallic elements of the solution and separate the impurities from the oil, separating the oil from the precipitate and subsequently treating the oil, first with alkali and then with chlorin liquor, alternating each treatment with water-washing, and finally steaming the oil, substantially as described.

5. The process of deodorizing and purifying petroleum-oil which consists in effecting the solution in the oil of a metallic soap or emulsion formed of the oxids of lead or manganese or both oxids mixed saponified with a mixture of cotton-seed oil and petroleum, subsequently adding acid to decompose the soap and precipitate the metallic elements thereof and drive off the skunky element as a vapor, separating the oil from the precipitate, and afterward treating the oil, first with alkali and then with chlorin liquor, alternating each treatment with water-washing, and finally steaming the oil, substantially as described.

6. The process of deodorizing and purifying petroleum-oil which consists in effecting the solution in the liquid oil of a metallic soap or emulsion, and thoroughly diffusing the same in the oil by agitation, whereby a reaction takes place between the oil and the metallic elements added, then breaking up the combination thus formed by the addition of acids and alkali, whereby the impurities originally present and those added to the oil precipitate, separating the oil from such precipitated impurities, and subsequently washing the oil with alkaline and chlorin solutions, substantially as described.

7. The process of deodorizing and purifying petroleum-oil which consists in effecting the diffusion or solution in the oil of a metallic soap or emulsion, subsequently adding acid to break up the soap or emulsion and precipitate the metallic elements thereof and drive off the skunky element, separating the oil from the precipitate and afterward treating the oil with alkali, chlorin liquor, water and steam, substantially as described.

8. The process of deodorizing and purifying petroleum-oil which consists in effecting the diffusion or solution in the oil of a metallic soap or emulsion, formed of the oxids of lead or manganese or both oxids mixed saponified by a mixture of cotton-seed oil, water and petroleum, subsequently adding acid to break up the soap or emulsion and precipitate the metallic elements thereof and drive off the skunky element, separating the oil from the precipitate and afterward treating the oil with alkali, chlorin liquor, water and steam, substantially as described.

In testimony whereof I hereto affix my signature in presence of two witnesses.

JOHN BRAGG.

Witnesses:
LORON PRENTISS,
ALFRED H. COWLES.